Oct. 31, 1961   S. D. RUSSELL   3,006,207
BALER DRIVE MECHANISM
Original Filed March 10, 1948   3 Sheets-Sheet 1
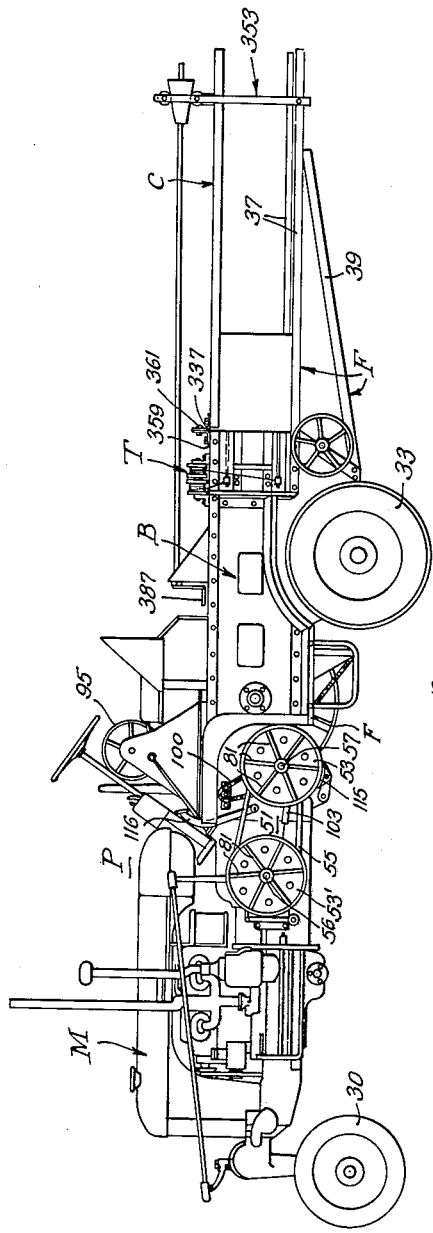
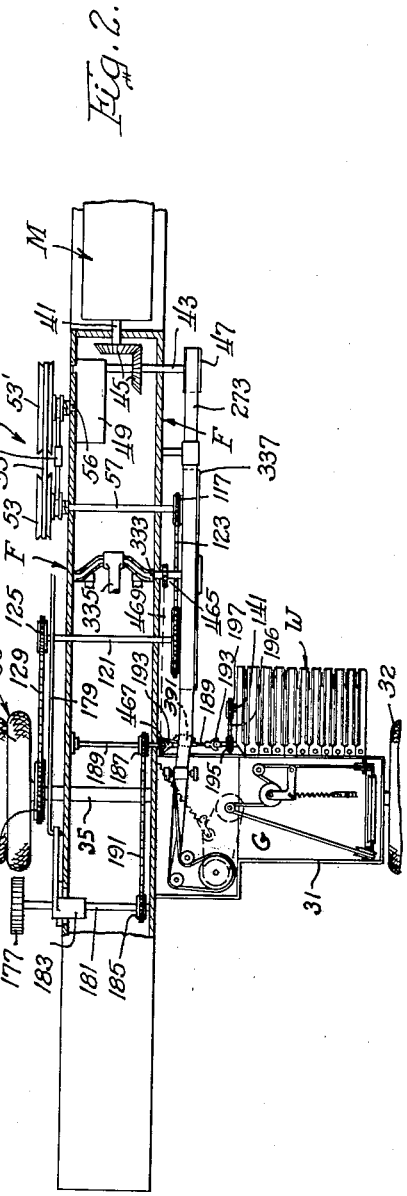
Inventor:
Stanley D. Russell.
By Emerson B Donnell
Attys

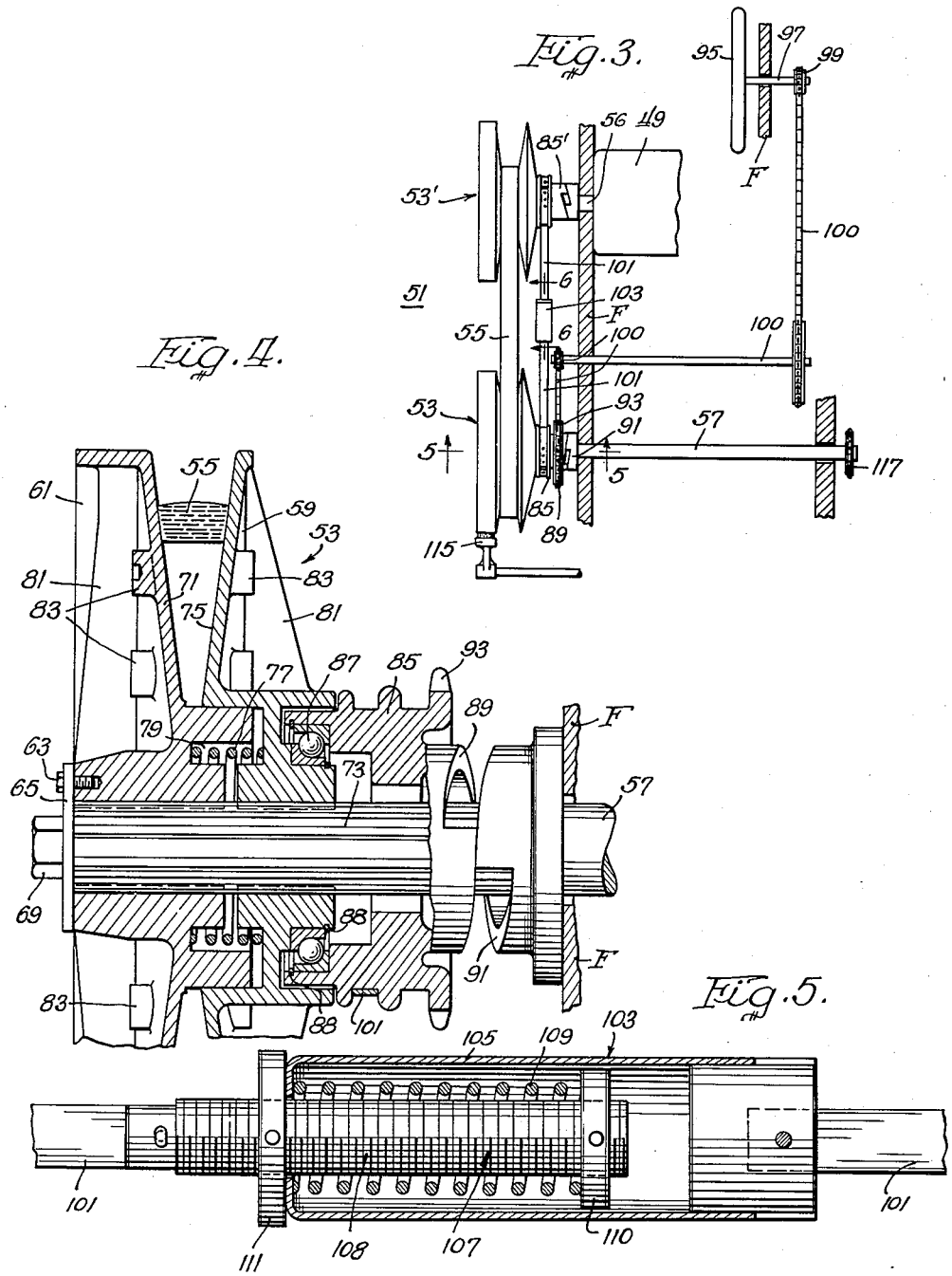

Oct. 31, 1961 S. D. RUSSELL 3,006,207
BALER DRIVE MECHANISM
Original Filed March 10, 1948 3 Sheets-Sheet 3
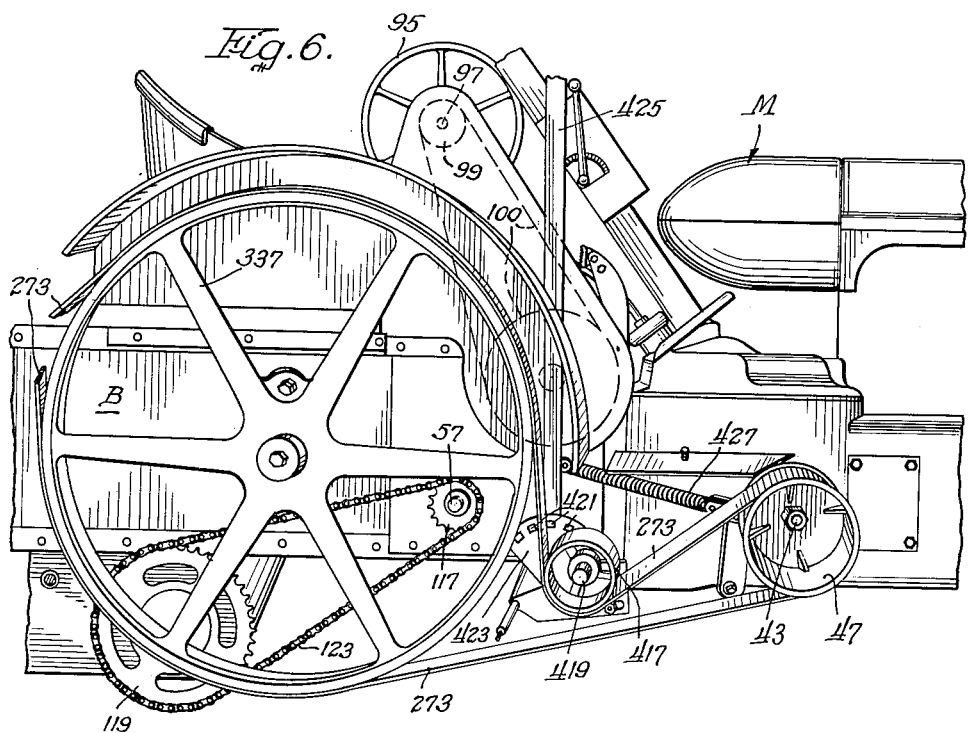
Inventor:
Stanley D. Russell.
By
Emerson B Donnell
Attys.

United States Patent Office 3,006,207
Patented Oct. 31, 1961

3,006,207
BALER DRIVE MECHANISM
Stanley D. Russell, Racine, Wis., assignor to J. I. Case Company, Racine, Wis., a corporation of Wisconsin
Application Sept. 8, 1953, Ser. No. 378,904, now Patent No. 2,834,177, dated May 13, 1958, which is a division of application Ser. No. 13,969, Mar. 10, 1948, now Patent No. 2,674,839, dated Apr. 13, 1954. Divided and this application Aug. 2, 1957, Ser. No. 678,756
5 Claims. (Cl. 74—230.17)

The present invention relates generally to balers and, in particular, relates to an improved pick-up baler construction. This application is a division of my co-pending application Serial No. 378,904, filed September 8, 1953, now Patent No. 2,834,177, which in turn is a division of my application Serial No. 13,969, filed March 10, 1948, issued April 13, 1954, as Patent No. 2,674,839.

The principal object of the present invention is to provide an improved drive means for a pick-up baler. More specifically, it is an object of the invention to provide a drive means whereby the speeds of the several driven elements of the baler are controlled to afford a smooth and efficient operation of the entire baling unit within a range determined by the characteristics of the prime mover.

Other objects and advantages of the invention will become apparent as reference is had to the following description and the accompanying drawings of preferred embodiments of various of the novel features disclosed herein.

In the drawings:

FIG. 1 is an elevational view of the left side of a self-propelled baler constructed in accordance with the invention;

FIG. 2 is a diagrammatic, plan view of the drive mechanism of a self-propelled baler constructed in accordance with the invention;

FIG. 3 is a diagrammatic plan view of the variable speed V-belt assembly which forms an important part of the prime mover illustrated in FIGS. 1 and 2;

FIG. 4 is a sectional view taken on line 4—4 of FIG. 3;

FIG. 5 is a sectional view taken on line 5—5 of FIG. 3;

FIG. 6 is a fragmentary, perspective view of the drive elements which operatively connect the prime mover to the baling mechanism and including certain control mechanism.

Pick-up balers are of two general types; the pull type and the self-propelled type. The self-propelled baler includes, as an integral unit, a prime mover which is adapted to move the implement about the field as well as to provide the power to drive the various mechanisms which are necessary to the efficient operation of the baler. The pull type implement is drawn by a tractor or other draft vehicle and is powered from a power take off, from a separate engine, or from an operative connection to one of the ground wheels. The baler to be discussed in the greatest detail is of the self-propelled type, but it will be apparent that the various features of the invention are equally applicable to both types of balers.

This particular embodiment of a self-propelled baler comprises a prime mover P which includes a frame portion F on which are journalled suitable support wheels so that the apparatus can be moved about a field, a windrow pick-up unit W, a feeding unit G, a baling chamber B, an adjustable bale case C, and a bale tying or fastening means T.

*Prime mover*

The prime mover P, in the self-propelled baler, is adapted to support the various elements of the baler for movement about the field, and to provide the power which is necessary to energize the various mechanisms of the baler as well as the power which is required to move the baler about the field. The prime mover P includes a generally T-shaped frame F (FIGS. 1 and 2) which comprises a longitudinally extending section which is adapted to be supported by a support wheel 30 at its forward end, a plurality of structural members which form the baling chamber B and the bale case C at the rearward end of the longitudinally extending section, and a transversely extending, outrigger-like frame 31 which is adapted to support the windrow pick-up W and the crop feeding means G. The wheel 30 supports the forward end of the longitudinally extending frame and a pair of spaced-apart support wheels 32 and 33 are journalled onto an axle 35 which forms a part of the outrigger-like frame 31.

In the structure illustrated, the forward end of the longitudinally extending frame and the motive power for the various elements are provided by the forward portion of a tricycle type, medium-sized, tractor M. The part of the tractor M which is employed in the structure, is that part which is normally ahead of the transmission, and includes the forward wheel assembly, the steering mechanism, the engine, the clutch, and the usual propeller shaft. The main structural members which form the rearward end of the longitudinally extending frame are a pair of rearwardly extending, parallel, spaced-apart angle members 37 (FIGS. 1 and 2) which form a suitable support under the baling chamber B and the bale case C. The angle members 37 are suitably braced by appropriate bracing members 39.

The power for the windrow pick-up unit W, the crop feeding unit G, and the baling mechanism and the power to move the implement about the field is transmitted from the engine by a propeller shaft 41 (FIG. 2) to a cross shaft 43 by means of a bevel gear set 45. The cross shaft 43 is journalled in suitable bearings on the frame F of the implement. A drive pulley 47 is keyed to one end of the cross shaft 43 and the pulley 47 is adapted to drive the various elements of the harvester. The other end of the cross shaft 43 is connected into a conventional, three-speed transmission and clutch combination 49, adapted to transmit the power necessary to move the implement about the field. Power is transmitted to the support wheel 33 from the three-speed transmission 49 by means of a novel V-belt, variable speed, drive assembly 51 and a series of chains and sprockets. The variable, V-belt, drive assembly 51 is adapted to be continuously adjustable so that the rate of movement of the baler can be maintained at the optimum baling speed.

The V-belt assembly 51 (FIGS. 3, 4, and 5) includes a pair of spaced-apart, adjustable width pulleys 53 and 53' which are connected by a V-belt 55. Pulley 53' is attached to the output shaft 56 of the three-speed transmission 49 and the other pulley, 53, is attached to a cross shaft 57 which is rotatably journalled in the main frame F. The end portion 73 of each of the shafts 56 and 57 is splined so that the spacing of the pulleys can be adjusted on the shafts.

The adjustable pulleys 53 and 53' are constructed in an identical manner so that in the following description only pulley 53 will be described. The pulley 53 includes an inner disc 59 which is movable toward and away from a fixed outer disc 61. The outer disc 61 is rigidly attached to the end of the shaft 57 by means of a cap screw 63 which engages a thrust plate 65 on the end of the shaft 57 (FIG. 4). The thrust plate 65 may be conveniently attached to the shaft 57 by means of a cap screw 69. The inner face 71 of the outer disc 61 tapers inwardly towards the center of the disc at the same slope as the face of the V-belt 55 so that a constant contact force will be maintained between the face of the belt 55 and the inner face 71 of the disc 61. The hub of the movable or inner disc 59 engages the splined portion of the shaft 57 and is movable longitudinally therealong. The outer face 75 of the inner disc 59 tapers outwardly so that it engages the inner face of the V-belt 55. The inner disc 59 may be biased inwardly, toward the frame F, by means of a coil spring 77 which can be disposed within a recess 79 in the hub portion of the outer disc 61 (FIG. 4). The inner and outer discs 59 and 61 respectively, are each provided with reinforcing webs 81 to strengthen the faces of the discs which co-act with the V-belt 55. In order that the pulleys may be statically and dynamically balanced, counter weighting portions 83 are formed as an integral part of each of the discs and these may be drilled out to balance the assemblage.

Relative positioning of the inner and outer discs, 59 and 61, is accomplished by means of a sleeve 85 which is journalled for free rotation relative to the splined portion 73 of the shaft 57. A throat-type ball bearing ring 87 is provided between the disc positioning sleeve 85 and the inner disc 59 so that the rotation of the inner disc does not rotate the sleeve 85; the ball bearing ring 87 is held in position by a pair of snap rings 88. The inner face 89 of the disc positioning sleeve 85 is a cam surface and this face co-acts with a complementary, mating, cam surface 91 fixedly attached to the main frame F. The forces resulting from rotation of the sleeve 85 and the resulting relative movement of the cam surfaces 89 and 91 will effect longitudinal movement of the sleeve 85 along the spline portion 73 of the shaft 57. This longitudinal movement of the sleeve 85 will, in turn, effect movement of the inner disc 59 outwardly relative to the outer disc 61 and the spring 77 or the tension of the belt 55 alone, will separate the discs when the disc adjusting sleeve 85 is rotated in the opposite direction.

The pulley 53' is provided with a cam surfaced, adjusting sleeve 85' which is similar to the adjusting sleeve 85 which has been described in connection with pulley 53. The two sleeves are mechanically interconnected so as to move together by means of a pair of flexible strips of metal 101 which are joined by an adjustable, resilient, shock absorber and tensioning device 103 (FIG. 5). The pulleys are relatively positioned by means of the interconnected, disc positioning sleeves 85 and 85' and any increase in spacing between the discs on one pulley will automatically decrease the spacing between the disc on the other pulley an equivalent amount. This assures the maintenance of the V-belt 55 at proper tension at all times.

Adjustment of the position of the sleeves 85 and 85' is accomplished by means of a sprocket 93 which forms an integral part of the sleeve 85 on the pulley 53. Movement of this sprocket is effected from a hand wheel 95 which is located on the baler frame within reach of the baler operator. The hand wheel 95 is keyed to a suitable shaft 97 which is journalled in the frame F, and a sprocket 99 attached to the shaft 97 is connected to the sprocket 93 on the sleeve 85 by means of a suitable chain and sprocket linkage 100.

The cam surfaces associated with the forward pulley 53' are a mirror image of the cam surfaces associated with the rearward pulley 53 so that upon rotation of the sleeves 85 and 85' in the same direction, the faces on one pulley will move apart while the faces on the other pulley will move together the same distance. This movement causes the effective diameter of each of the pulleys, as applies to the V-belt 55, to change, and thus makes possible smooth and accurate adjustment of the speed of the implement. In the structure illustrated, the connection between the positioning sleeves 85 and 85' is made on the lower side of each of the sleeves; but if the direction of the cam surfaces should be reversed, the connection would be made on the upper side of each of the sleeves.

Under some conditions it may be desirable to eliminate the pair of mating cam surfaces on one of the pulleys and the strip connecting means. In this case the effective diameter of the pulleys can be controlled by adjusting one of the pulleys in the described manner, and spring biasing the movable disc of the other pulley against the V-belt so that it automatically compensates for the change in diameter of the first pulley.

The resilient shock absorber 103 which joins the flexible strips 101 includes a body portion 105 which is attached at one end to one of the strips 101 and a plunger-like member which includes a threaded rod 108 having a spacer member 110 attached to its end. The spacer member 110 of the plunger-like member 107 is adapted to move within the body portion 105 and the other end of the threaded rod 108 is attached to the other of the flexible strips 101. The spacer member 110 is biased by means of a coil spring 109 within the body of the shock absorber 103 so as to resist longitudinal forces which tend to extend the strips 101. Adjustment of the spring tension in the shock absorber 103 is accomplished by means of a threaded, positioning bushing 111 which engages the threaded rod portion 108 of the plunger-like member 107 (FIG. 5). The bushing 111 abuts against the outer end of the body 105 of the shock absorber 103. A decrease in the overall length of the shock absorber increases the tension on the belt 53.

A brake for the implement may be provided by a brake shoe 115 which engages the edge of the outer disc 61 of the rear pulley 53 and the pressure of the brake shoe 115 may be conveniently controlled by means of a foot pedal 116 (FIG. 1) located near the baler operator.

A sprocket 117 is attached to the outer end of the cross shaft 57 and the sprocket 117 is connected to a sprocket 119 on a second cross shaft 121 by means of a chain 123. A sprocket 125 is keyed to the other end of shaft 121, and this sprocket is operatively connected by means of a chain 129 to a sprocket 127 attached to the ground wheel 33. Power is thus positively transmitted from the V-belt drive 51 to the drive wheel 33 by means of the sprocket and chain connections.

It will be noted that the two tires 131 and 133 on the drive wheel 33 are of differing sizes, the outer tire 133 having a diameter which is 2 to 3 inches less than the diameter of the inner tire 131. It has been found that this arrangement of the drive wheel tires provides more positive traction in a soft field and facilitates the efficient movement of the implement about the field by its single driven wheel.

The novel variable V-belt drive which has been described in the foregoing may be used either alone or in combination with a conventional three-speed transmission to accurately control the ground speed of the baler. However, the combination of the three-speed transmission and the variable V-belt drive permits extremely accurate adjustment between the speeds of the transmission without requiring unduly large variations in the effective diameters of the pulleys.

One of the important features of the drive unit is that the tractor engine is normally operated at a constant speed during the operation of the implement, while the ground speed is varied by means of the three-speed transmission and the variable V-belt drive. This feature of a constant engine speed and variable ground speed enables the operator to run the implement along the ground at the optimum speed for baling while, at the same time driving the baling mechanism at a constant speed from the engine. Thus, the baling mechanism can be operated to pick up the material to be baled at a substantially uniform rate, regardless of the size of the windrow. Also, the baling mechanism will be subjected to less wear because its speed does not vary when the speed of the implement along the ground is changed.

Various of the features of the invention that are believed to be new are set forth in the appended claims.

I claim:

1. A variable speed transmission for connecting a power input shaft and a power output shaft, said shafts being parallel and being spaced from one another, each of said shafts including a splined portion, a pulley attached to each of said shafts, each pulley including a pair of spaced-apart discs whose adjacent surfaces define the groove of said pulley, each of said discs being adapted to rotate with said shaft, one of the discs of each pair being fixed to its associated shaft and the other disc of said pair slidably engaging said splined portion of said shaft for longitudinal movement therealong, the adjacent surfaces of said fixed disc and said movable disc evenly diverging from each other from a point adjacent said shaft to a point on the rim of said disc, the groove defined by said surfaces tapering inwardly toward said shaft, a V-belt connecting said pulleys and being adapted to run in said groove between said fixed discs and said movable discs, and means for applying force to said movable discs to adjust the spacing between said fixed discs and said movable discs, the last mentioned means including a cam member adapted to operatively engage each of said movable discs, a free running thrust bearing intermediate said cam member and said movable disc, said cam members being interconnected by means affording relative movement of one of said pairs of discs while effecting compensating movement in the other of said pairs of discs, said interconnecting means including a resilient body, and means for moving one of said cam members to effect a change in the spacing of said discs, and a corresponding change in the effective diameter of said pulleys.

2. A variable speed transmission for connecting a power input shaft and a power output shaft, said shafts being parallel and being spaced from one another, a pulley attached to each of said shafts, each pulley including a pair of spaced-apart discs whose surfaces define the groove of said pulley, one of the discs of each pair being fixed to its associated shaft and the other disc of each pair slidably engaging said shaft for longitudinal movement therealong, a V-belt connecting said pulleys and being adapted to run in the groove formed between said fixed discs and said movable discs, and means for adjusting the spacing between said fixed discs and said movable discs whereby the effective diameter of one of said pulleys becomes larger and the effective diameter of the other of said pulleys is reduced a corresponding amount, the last mentioned means comprising a sleeve rotatably carried by each of said shafts in position for engagement with said slidable disc, said sleeve being movable axially of said shaft and including a spiral cam surface on the end of the sleeve opposite the end that engages said slidable disc, fixed means defining a complementary spiral cam surface in position for engagement with the cam surface on said sleeve, control means for effecting rotation of one of said sleeves, and means interconnecting said one sleeve with the other of said sleeves so as to effect simultaneous rotation of said sleeves upon operation of said control means, said interconnecting means including a shock absorbing element for yieldably resisting a change in the position of said slidable discs in response to belt tension during operation of said transmission.

3. A variable speed transmission for connecting a power input shaft and a power output shaft, said shafts being parallel and being spaced from one another, a pulley attached to each of said shafts, each pulley including a pair of spaced apart discs whose surfaces define the groove of said pulley, said discs being adapted to rotate with their associated shafts, one of the discs of each pair being fixed to its associated shaft and the other disc of each pair slidably engaging said shaft for longitudinal movement therealong, a V-belt connecting said pulleys and being adapted to run between said fixed discs and said movable discs, and means for applying force to said movable discs to adjust the spacing between said fixed discs and said movable discs, the last mentioned means comprising a sleeve rotatably mounted on each of said shafts for axial movement with said slidable discs, each of said sleeves having one end engaging the associated one of said slidable discs and having formed at the other end a generally spiral cam surface, the cam surface on one sleeve having a reverse spiral with respect to the cam surface on the other sleeve, a complementary spiral cam for each of said sleeves which is fixed in position for engagement with the spiral cam surface on the associated sleeve, control means for effecting selected rotation of one of said sleeves, and means interconnecting said one sleeve with the other sleeve to afford simultaneous rotation of said sleeves in response to operation of said control means, whereby said slidable discs will be moved relative to their associated fixed disc an equal amount and in opposite directions, said interconnecting means including an adjustable yieldable element affording a limited amount of movement of said other sleeve without affecting the position of said one sleeve and providing a yieldable tension on said belt.

4. A variable speed transmission for connecting a power input shaft and a power output shaft, said shafts being parallel and spaced from each other, a pulley attached to each of said shafts, each pulley including a pair of spaced-apart disks whose adjacent surfaces define the groove of said pulley, each of said disks being adapted to rotate with said shaft, one of the disks of each pair being fixed to its associated shaft and the other disk of said pair being slidably but nonrotatively engaged with said shaft for longitudinal movement therealong, the adjacent surfaces of said fixed disk and the movable disk evenly diverging from each other from a point adjacent said shaft to a point on the rim of said disk, the groove defined by said surfaces tapering inwardly toward said shaft, a V-belt connecting said pulleys adapted to run in said groove between said fixed disks and said movable disks, and means for supplying force to said movable disks to adjust the spacing between said fixed disks and said movable disks, the last mentioned means including a cam member adapted to operatively engage each of said movable disks, a free running thrust bearing between each cam member and its respective movable disk, said cam members being rotatable, each about one of said power input and power output shafts and arranged so that rotation of both cam members in the same direction will force one of said movable disks toward its respective fixed disk and release the other movable disk for movement away from its respective fixed disk, whereby the pressure of said belt tending to force said movable disks away from said fixed disks will tend to cause rotation of said cams in opposite directions, an elongated flexible tension member wrapped about and extending between said cam members, and engaged with the latter on the sides necessary to prevent rotation of said cams by reason of said pressure of said belt, and means for rotating one of said cam members to effect a change in the spacing of said disks, and a corresponding change in the effective diameter of said pulleys.

5. A variable speed transmission for connecting a power input shaft and a power output shaft, said shafts being parallel and spaced from each other, a pulley attached to each of said shafts, each pulley including a pair of spaced-apart disks whose adjacent surfaces define the groove of said pulley, each of said disks being adapted to rotate with said shaft, one of the disks of each pair being fixed to its associated shaft and the other disk of said pair being slidably but non-rotatively engaged with said shaft for longitudinal movement therealong, the adjacent surfaces of said fixed disk and the movable disk evenly diverging from each other from a point adjacent said shaft to a point on the rim of said disk, the groove defined by said surfaces tapering inwardly toward said shaft, a V-belt connecting said pulleys adapted to run in said groove between said fixed disks and said movable disks, and means for supplying force to said movable disks to adjust the spacing between said fixed disks and said movable disks, the last-mentioned means including a cam member adapted to operatively engage each of said movable disks, a free running thrust bearing between each cam member and its respective movable disk, said cam members being rotatable, each about one of said power input and power output shafts and arranged so that rotation of said cam members in predetermined directions will force one of said movable disks toward its respective fixed disk and release the other movable disk for movement away from its respective fixed disk, whereby the pressure of said belt tending to force said movable disks away from said fixed disks will tend to cause rotation of said cams in directions opposite to said predetermined directions, an elongated flexible tension member wrapped about and extending between said cam members, and engaged with the latter on the sides necessary to prevent rotation of said cams by reason of said pressure of said belt, and means for rotating one of said cam members to effect a change in the spacing of said disks, and a corresponding change in the effective diameter of said pulleys.

References Cited in the file of this patent

UNITED STATES PATENTS

| | | |
|---|---|---|
| 1,235,794 | Hardaker | Aug. 7, 1917 |
| 1,496,364 | Bonnafoux | June 3, 1924 |
| 1,501,705 | Decoux | July 15, 1924 |
| 2,073,846 | Maurer | Mar. 16, 1937 |
| 2,136,437 | Hollestelle | Nov. 15, 1938 |
| 2,191,531 | Judelshon | Feb. 27, 1940 |
| 2,262,782 | Strom | Nov. 18, 1941 |
| 2,431,828 | Raney | Dec. 2, 1947 |
| 2,573,937 | Turnbull | Nov. 6, 1951 |
| 2,589,897 | Turnbull | Mar. 18, 1952 |
| 2,609,700 | Monternarani | Sept. 9, 1952 |